(12) United States Patent
Barsook et al.

(10) Patent No.: US 9,820,002 B2
(45) Date of Patent: Nov. 14, 2017

(54) SYSTEM AND METHOD FOR ENABLING REVIEW OF A DIGITAL MULTIMEDIA PRESENTATION AND REDIRECTION THEREFROM

(71) Applicant: Disney Enterprises, Inc., Burbank, CA (US)

(72) Inventors: Jonathan David Barsook, Studio City, CA (US); Ariff Sidi, Studio City, CA (US); Skarphedinn Hedinsson, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 387 days.

(21) Appl. No.: 14/588,568

(22) Filed: Jan. 2, 2015

(65) Prior Publication Data

US 2015/0222956 A1 Aug. 6, 2015

Related U.S. Application Data

(63) Continuation of application No. 12/229,467, filed on Aug. 22, 2008, now Pat. No. 9,026,911.
(Continued)

(51) Int. Cl.
*G06F 3/00* (2006.01)
*H04N 21/482* (2011.01)
(Continued)

(52) U.S. Cl.
CPC ....... *H04N 21/482* (2013.01); *H04N 5/44513* (2013.01); *H04N 5/775* (2013.01);
(Continued)

(58) Field of Classification Search
CPC ............... G06Q 30/02; G06Q 30/0269; G06Q 30/0277; G06Q 10/10; G06Q 30/0241;
(Continued)

(56) References Cited

U.S. PATENT DOCUMENTS 6,669,564 B1 * 12/2003 Young ................. A63F 13/10
463/42
2003/0091329 A1  5/2003 Nakata
(Continued)

OTHER PUBLICATIONS

Michael Miller (herein after Miller), Youtube 4 You, (Apr. 26, 2007).*

*Primary Examiner* — Di Xiao
(74) *Attorney, Agent, or Firm* — Farjami & Farjami LLP

(57) ABSTRACT

There is presented a system for providing a digital multimedia presentation. The system comprises a presentation server; a presentation content database accessible through the presentation server, the presentation content database configured to store a plurality of contents including the digital multimedia presentation, a plurality of digital media contents and a plurality of advertising contents; and a review and redirection application configured to determine at least one of the plurality of digital multimedia contents as an alternative to the digital multimedia presentation, and provide a review and redirection pane integrated with a contextual background corresponding to the digital multimedia presentation; the review and redirection pane configured to enable play of the digital multimedia presentation, redirection to the at least one of the plurality of digital multimedia contents, and selection of at least one of the plurality of advertising contents associated with the digital multimedia presentation.

10 Claims, 4 Drawing Sheets

Related U.S. Application Data

(60) Provisional application No. 61/124,193, filed on Apr. 14, 2008.

(51) Int. Cl.
| | |
|---|---|
| *H04N 5/445* | (2011.01) |
| *H04N 5/775* | (2006.01) |
| *H04N 21/8549* | (2011.01) |
| *H04N 21/431* | (2011.01) |
| *H04N 21/4722* | (2011.01) |
| *H04N 21/475* | (2011.01) |
| *H04N 21/4788* | (2011.01) |
| *H04N 21/81* | (2011.01) |
| *H04N 21/8545* | (2011.01) |
| *H04N 21/858* | (2011.01) |

(52) U.S. Cl.
CPC ..... *H04N 21/4316* (2013.01); *H04N 21/4722* (2013.01); *H04N 21/4758* (2013.01); *H04N 21/4788* (2013.01); *H04N 21/4826* (2013.01); *H04N 21/812* (2013.01); *H04N 21/858* (2013.01); *H04N 21/8545* (2013.01); *H04N 21/8549* (2013.01)

(58) Field of Classification Search
CPC ........... G06Q 30/0267; G06Q 30/0244; G06Q 30/0251; G06Q 30/0276; G06Q 30/0242; G06Q 30/0273
See application file for complete search history.

(56) References Cited

U.S. PATENT DOCUMENTS

| | | |
|---|---|---|
| 2005/0091597 A1 | 4/2005 | Ackley |
| 2007/0203942 A1 | 8/2007 | Hua |
| 2008/0253746 A1* | 10/2008 | Wood ................... G11B 27/034 386/248 |
| 2008/0271095 A1 | 10/2008 | Shafton |
| 2009/0150808 A1* | 6/2009 | Aldrey ............... H04N 5/44543 715/764 |
| 2009/0220206 A1 | 9/2009 | Kisliakov |
| 2010/0262912 A1 | 10/2010 | Cha |

* cited by examiner

SYSTEM AND METHOD FOR ENABLING REVIEW OF A DIGITAL MULTIMEDIA PRESENTATION AND REDIRECTION THEREFROM

RELATED APPLICATIONS

This application is a Continuation of U.S. application Ser. No. 12/229,467, filed Aug. 22, 2008, which claims priority to U.S. Provisional Application No. 61/124,193, filed on Apr. 14, 2008, which is hereby incorporated by reference in its entirety.

BACKGROUND OF THE INVENTION

1. Field of the Invention

The present invention relates generally to the management of media content. More particularly, the present invention relates to computer mediated selection of digital media content.

2. Background Art

Traditionally, the availability of publicly accessible media content, such as broadcast television (TV) content, has been managed by the entities, such as TV networks, providing the content. As a result, consumers had a fairly limited menu of content items from which to identify desirable content. In that traditional media environment, consumers identified and located desirable media content through a program listing, which in the early days of broadcast TV was typically a paper listing, and more recently began to be provided as an electronic listing, such as an Electronic Program Guide for example. While this conventional approach to enabling identification of desirable media content may have been helpful to consumers when their choices were relatively limited, it has grown progressively more inefficient, and less effective, as available media content has proliferated.

The emergence of the Internet, for example, as a computer network resource enabling consumers to obtain media content online, has only made the deficiencies of the traditional approach more acute. Paradoxically, the ready availability of so much content so easily obtained, may have served as much to hinder as to enhance accessibility of that content to consumers, and may make it actually less likely that the consumer will successfully identify and locate content of genuine interest to them. For the consumer of today, identifying and locating content of real interest can be a time consuming and frustrating experience despite its abundant availability.

For example, consider the case of a consumer seeking to access a digital multimedia presentation corresponding to desirable TV programming, online. One conventional approach to assisting a consumer to locate desirable content borrows from the broadcast TV model by merely providing a listing of available content. That approach is particularly inefficient due to the vast amount of content from which the consumer can typically now choose.

Another conventional approach utilizes standard computer based information management tools to assist the consumer in identifying the desired presentation from a library of available content items. According to that approach, the consumer might be required to sort through the available content items, categorized according to genre, subject matter, or other criteria, to locate a particular desired presentation. This latter approach provides the consumer with some ability to discriminate among available content items according to broad themes, but provides a relatively rudimentary means for discovering specific content of genuine interest.

The greater variety of media content now available to consumers also has consequences for advertisers seeking to target a viewing audience. In the traditional broadcast TV environment, for example, advertisers could simply purchase advertising time and be reasonably assured that consumers, i.e. TV viewers, were being exposed to the overt marketing content delivered during those intervals. In the online media consumption environment of today, however, advertisers must more actively attract consumers, and sometimes do so by embedding marketing content into an advertising product that also comprises a substantial entertainment component, such as an interactive puzzle or game.

This relatively recent approach to providing marketing content may provide consumers with a heterogeneous advertising product comprising a suite of content including overt marketing materials, interactive entertainment content, and content elements blending those two concepts. A subset of that content may be provided to a consumer in a predetermined advertising spot, resembling a conventional commercial, while the remainder of the content may simply be available for the consumer to engage at will. A significant challenge for advertisers utilizing this approach may be to regain the attention and interest of the consumer after the predetermined ad spot has played, so that the consumer will voluntarily engage the remaining advertising content, and thus more fully absorb the embedded marketing message.

As has been explained, conventional approaches to providing media content no longer effectively assist consumers in identifying desirable content within the ever growing media libraries from which that content can now be selected. Furthermore, those conventional approaches no longer adequately assure advertisers that marketing content is being delivered to targeted consumers. Accordingly, there is a need to overcome the drawbacks and deficiencies in the art by providing a solution enabling consumers to readily identify and navigate to desirable media content. The solution should additionally provide a means for advertisers to deliver marketing content to consumers in a manner that engages the consumer as a participant in an interactive process.

SUMMARY OF THE INVENTION

There are provided systems and methods for enabling review of a digital multimedia presentation and redirection therefrom, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
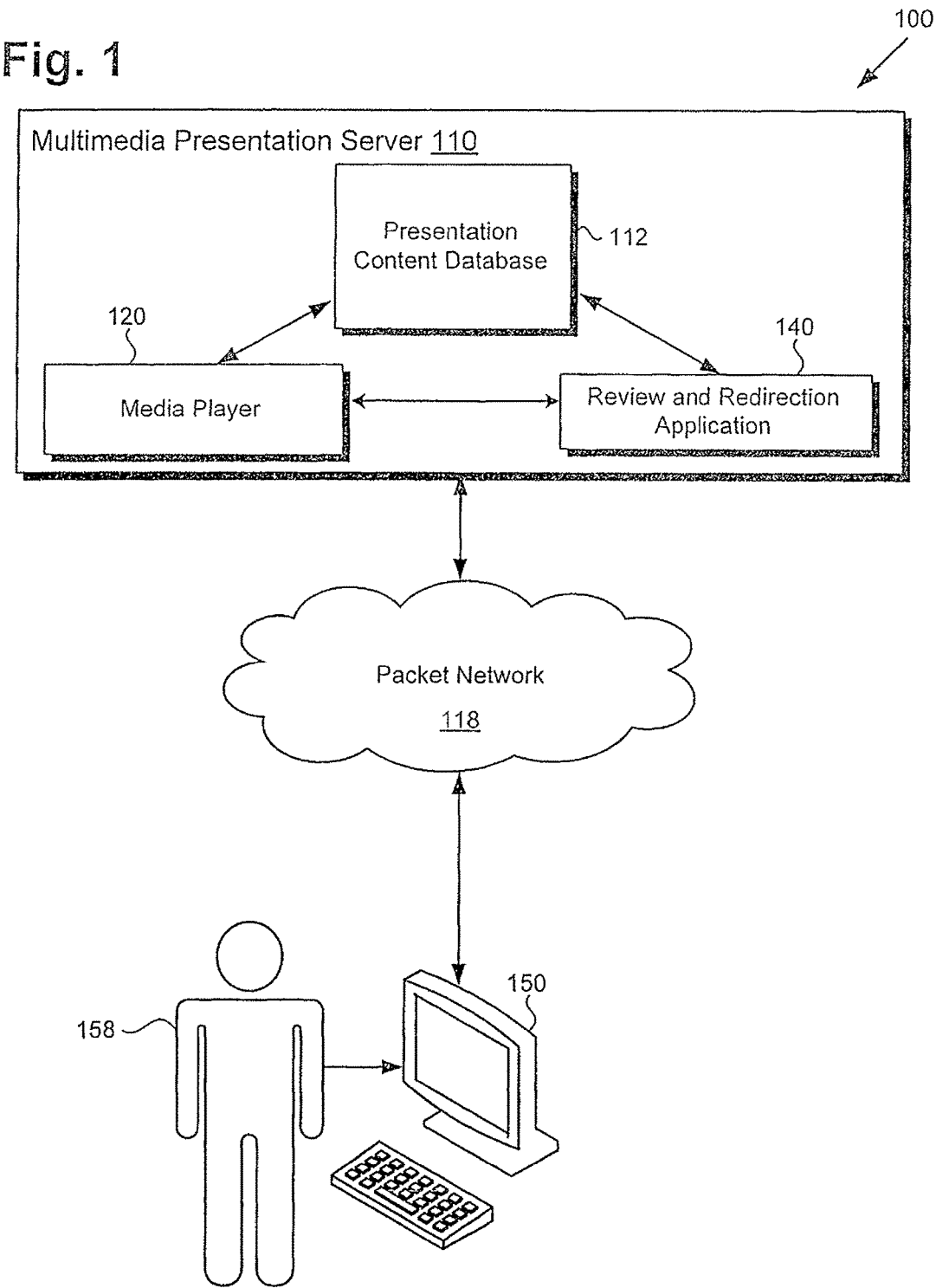
FIG. 1 shows a block diagram of a system enabling review of a digital multimedia presentation and redirection therefrom, according to one embodiment of the present invention.

The present application is directed to a system and method enabling review of a digital multimedia presentation and redirection therefrom. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Turning now to FIG. 1, FIG. 1 is a block diagram of system 100 enabling review of a digital multimedia presentation and redirection therefrom, according to one embodiment of the present invention. In the embodiment of FIG. 1, system 100 comprises multimedia presentation server 110 including presentation content database 112, media player 120, and review and redirection application 140. Also included in FIG. 1 are packet network 118, client computer 150, and consumer 158. It is noted that although client computer 150 is represented as a personal computer (PC) in FIG. 1, in other embodiments client computer 150 may comprise another type of mobile or stationary personal communication device or system, such as a tablet computer, mobile telephone, personal digital assistant (PDA), gaming console, digital media player, or home entertainment system, for example.

According to the embodiment of FIG. 1, consumer 158 may utilize media player 120 and/or review and redirection application 140 to access content available on presentation content database 112. In one embodiment review and redirection application 140 may be configured to provide a user interface enabling consumer 158 to review the contents of a digital multimedia presentation, interact with advertising content associated with the presentation, or be redirected away from the presentation to recommended alternative content determined on the basis, for example, of consumption history, consumer preference, or predetermined recommendation criteria. Review and redirection application 140 may be implemented in combination with media player 120, as shown in FIG. 1, or may function independently of media player 120 as a stand alone application for enabling review of and redirection from digital multimedia content items stored on presentation content database 112.

Review and redirection application 140 may be utilized by consumer 158, either alone or in combination with media player 120, to experience supplemental features associated with digital multimedia content items available on presentation content database 112. Review and redirection application 140 may be used to view a synopsis or recap of a particular item of digital multimedia content, presented on a review and redirection pane integrated with a contextual background appropriate to the content being reviewed, for example.

In addition review and redirection application 140 may provide consumer 158 with one or more recommendations and links to alternative content. In one embodiment, recommendations may be editorially predetermined and associated with the item of digital multimedia content being reviewed by consumer 158. In another embodiment, review and redirection application 140 may comprise a recommendation engine (not shown in FIG. 1) configured to recommend alternative digital multimedia content items based on past viewing habits of the consumer, ratings provided by the consumer, or other selection criteria generated interactively or otherwise.

Furthermore, in some embodiments consumer 158 can utilize review and redirection application 140 to experience and/or interact with advertising content associated with the digital multimedia presentation being reviewed. In that embodiment, a review and redirection pane may also provide a list of advertising content associated with the digital multimedia presentation, and provide links to the items of advertising content, enabling the consumer to enjoy the advertising content without viewing or reviewing the presentation with which the advertising content is associated. In that way, the consumer may enjoy desirable games, puzzles, and other entertainments included in advertising content normally provided in advertising interludes during presentation of the digital multimedia presentation, independently of that presentation.

For example, in one embodiment a consumer viewing the review and redirection pane may not have previously viewed the digital multimedia presentation, but may nevertheless choose to consume and/or interact with advertising content associated with the presentation. Alternatively, the consumer may have recently viewed the digital multimedia presentation and seen brief advertising spots provided during the presentation. In that embodiment, the consumer may have detected desirable puzzles, games, and other interactive items contained in the advertising content, but not have wished to interrupt play of the digital media presentation to enjoy the items at that time. Under those circumstances, enabling the consumer to return to the advertising content after completion of the digital multimedia presentation permits the user to enjoy both the main presentation and the desirable advertising content to their fullest measure.

Thus, embodiments in which a consumer may selectively return to advertising content associated with a digital multimedia presentation provides benefits to consumers and advertisers alike. Consumers are advantageously empowered with a degree of selective control over the advertising content to which are exposed. At the same time those embodiments advantageously provide advertisers with the opportunity to attract consumers into a voluntary interaction with their advertising materials. As a result, consumers may be less likely to actively avoid advertising content, and more likely to be receptive to the advertising content to which they choose to interact.

In embodiments in which review and redirection application 140 is utilized in combination with media player 120, review and redirection application 140 may be configured to launch and display a review and redirection pane prior to completion of play of the digital multimedia presentation by media player 120, for example. In that way, consumer 158 may be notified of impending termination of the digital multimedia presentation, be given the opportunity to replay the presentation, and be provided recommended alternative content to enjoy, as well as have the opportunity to revisit advertising content provided during the presentation.

Consumer 158, may be an exemplary representative of a community of consumers, any of whom may seek to access content stored on presentation content database 112. Thus, in one embodiment, the digital multimedia content collected on presentation content database 112 may be hosted for the enjoyment and evaluation of such a community of consumers. In that embodiment, members of the community may view items of digital multimedia content collected on presentation content database 112, and utilize review and redirection application 140 to indicate their level of enjoyment by providing a rating feedback and/or commentary. The feedback from individual consumers may then be collected and made available to other members of the community of consumers.

Similarly, consumer 158 may access digital multimedia content collected on presentation content database 112, and provide a rating feedback and/or commentary. In one embodiment, review and redirection application 140 may be further configured to provide consumer 158 with an opportunity to interact with commentary about the presentation provided by the community of consumer, or communicate with members of that community. In another embodiment, consumer 158 can utilize media player 120 and/or review and redirection application 140 to embed a portion of a viewed digital media presentation on a web page selected by the consumer.

As shown in FIG. 1, review and redirection application 140 may be accessed through packet network 118. In that instance, review and redirection application 140 may comprise a web application, accessible over a packet network such as the Internet, configured to execute as a server based application on multimedia presentation server 110, for example. Alternatively, review and redirection application 140 may reside on a server supporting a local area network (LAN), or be included in another type of limited distribution network. In another embodiment, review and redirection application 140 may be stored on a portable computer-readable storage medium such as a compact disc read-only memory (CD-ROM).

Figure 2:
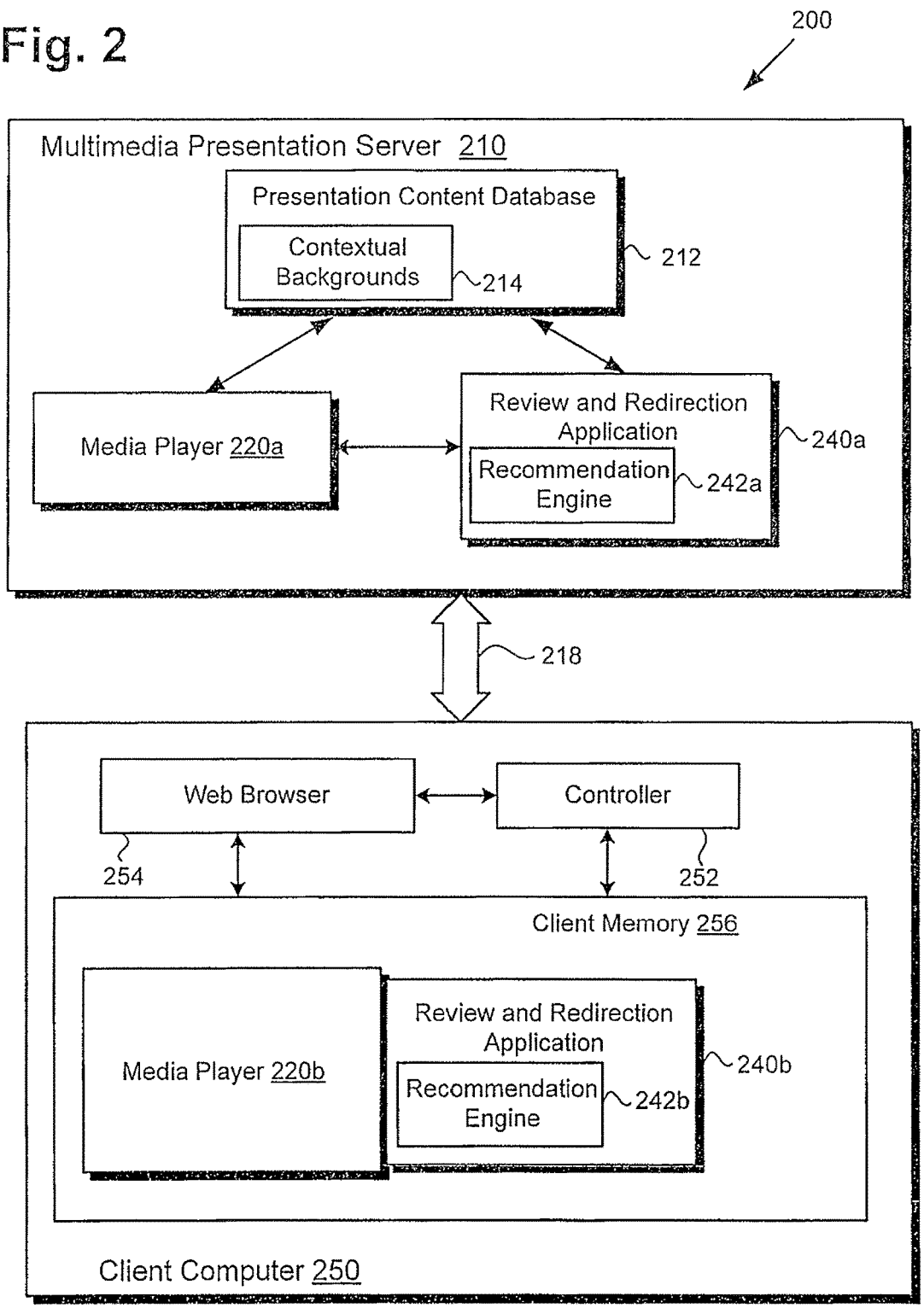
FIG. 2 shows a more detailed embodiment of a system enabling review of a digital multimedia presentation and redirection therefrom, according to one embodiment of the present invention.

Turning now to FIG. 2, FIG. 2 shows a more detailed embodiment of system 200 enabling review of a digital multimedia presentation and redirection therefrom, according to one embodiment of the present invention. System 200 in FIG. 2 includes client computer 250, receiving a download via communication link 218 from multimedia presentation server 210. Multimedia presentation server 210 is shown to comprise presentation content database 212 including contextual backgrounds 214, media player 220a, and review and redirection application 240a including recommendation engine 242a. Presentation content database 212, media player 220a, and review and redirection application 240a, in FIG. 2, correspond respectively to presentation content database 112, media player 120, and review and redirection application 140, in FIG. 1. Moreover, client computer 250, in FIG. 2, corresponds to client computer 150, in FIG. 1. As shown in FIG. 2, client computer 250 comprises controller 252, web browser 254, and client memory 256. Also shown in FIG. 2 are media player 220b and review and redirection application 240b including recommendation engine 242b.

According to the embodiment shown in FIG. 2, media player 220b and review and redirection application 240b are located in client memory 256, having been received from multimedia presentation server 210 via communication link 218. In the present embodiment, communication link 218 represents download of media player 220a and review and redirection application 240a, over a packet network, for example. In another embodiment, communication link 218 may represent transfer of media player 220a and/or review and redirection application 240a from a CD-ROM or other computer-readable storage medium. Once transferred, media player 220b and review and redirection application 240b may be stored in client memory 256 and executed locally on client computer 250, where review and redirection application 240b may be executed as a desktop application, for example. It is noted that communication link 218 is shown as a two-way communication, to represent ongoing communication between client computer 250 and presentation content database 212 on multimedia presentation server 210.

Controller 252 may be the central processing unit for client computer 250, for example, in which role controller 252 runs the client computer operating system, launches web browser 254, and facilitates use of media player 220b and review and redirection application 240b. Web browser 254, under the control of controller 252, may execute review and redirection application 240b to enable a consumer to review, and redirect from digital multimedia content available through multimedia presentation server 210.

Figure 3:
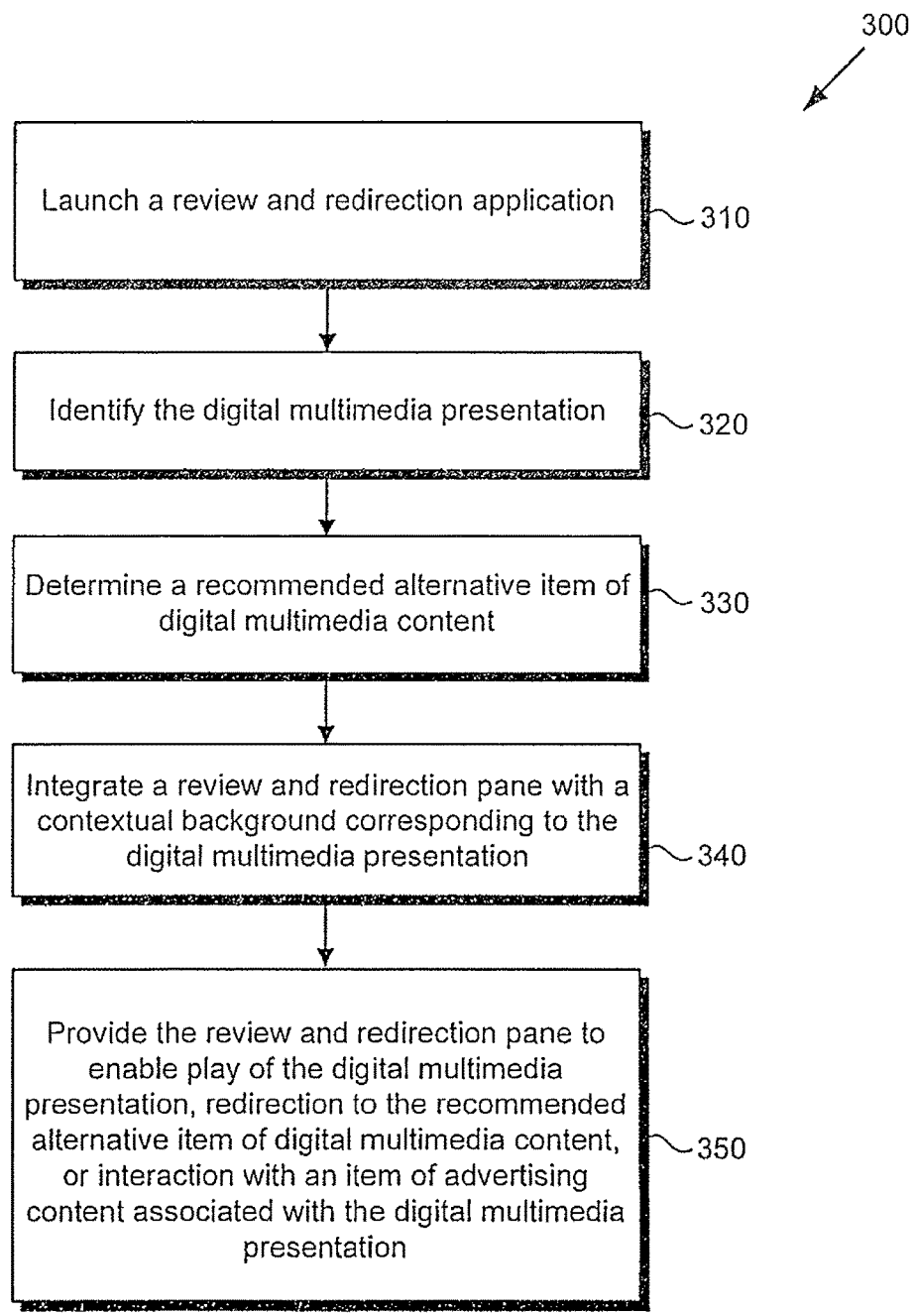
FIG. 3 is a flowchart presenting a method enabling review of a digital multimedia presentation and redirection therefrom, according to one embodiment of the present invention.
Figure 4:
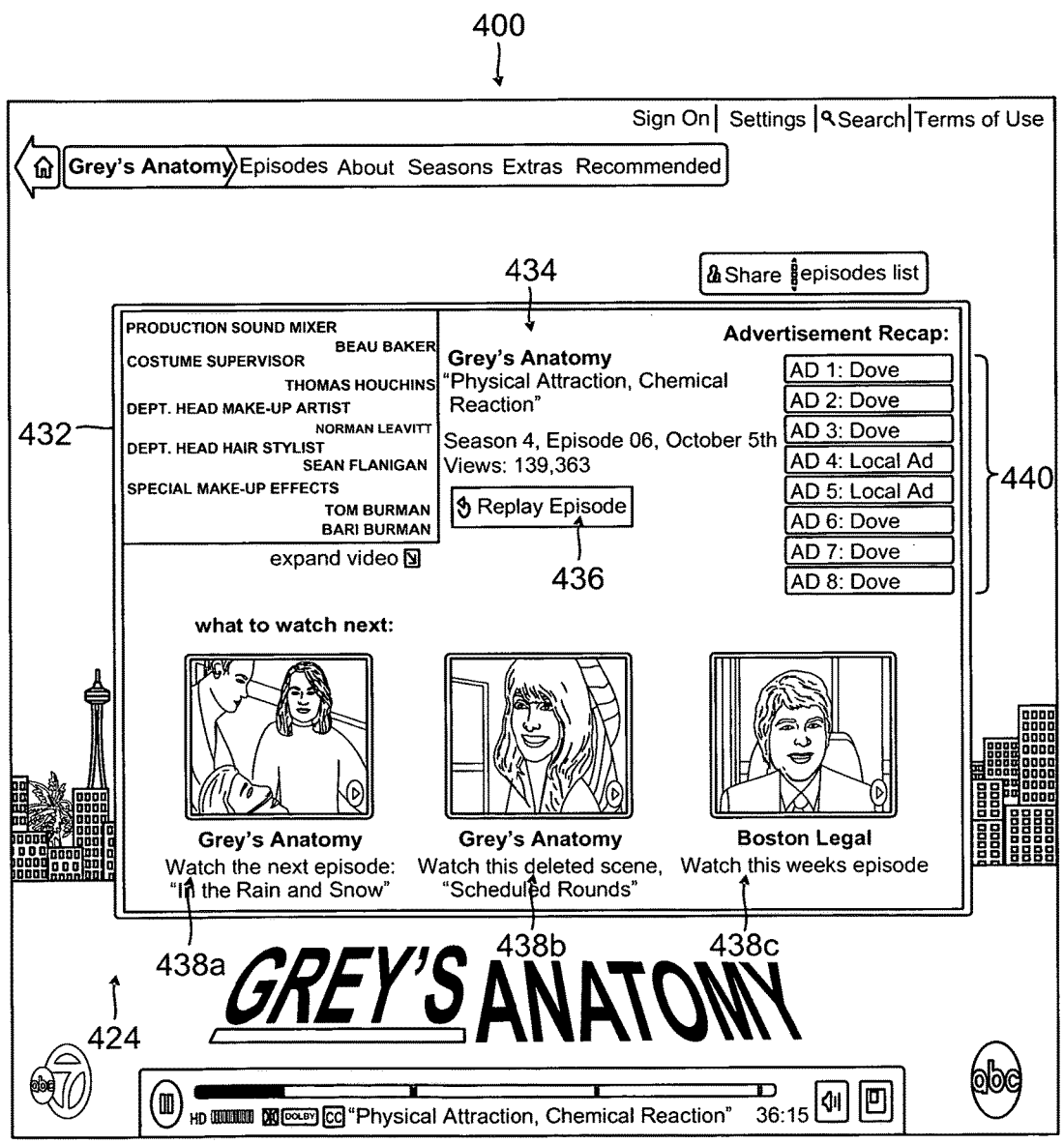
FIG. 4 shows a visual frame displaying an exemplary review and redirection pane associated with a digital multimedia presentation corresponding to an episode of the ABC TV program Grey's Anatomy, according to one embodiment of the present invention.

The systems shown in FIG. 1 and FIG. 2 will now be further described by additional reference to FIGS. 3 and 4. FIG. 3 shows an exemplary method enabling review, and redirection from a digital multimedia presentation. As a specific but non-limiting example implementing the method of FIG. 3, let us consider digital multimedia content corresponding to programming presented by a TV network, such as the American Broadcasting Company (ABC), for instance, and accessible online through the website ABC.com.

In accord with that exemplary scenario, FIG. 4 shows visual frame 400, which includes a sample review and redirection pane supporting review and redirection with respect to a particular episode of the ABC TV program Grey's Anatomy, according to one embodiment of the present invention. Visual frame 400 may be displayed on either or both of client computers 150 and 250, shown in respective FIGS. 1 and 2. It is noted that although for clarity of presentation, portions of the following description focus on one or the other of the systems shown by FIGS. 1 and 2, both systems are capable of enabling review of and redirection form a digital multimedia presentation in the manner described.

Returning to FIG. 3, FIG. 3 shows flowchart 300 describing the steps, according to one embodiment of the present invention, of a method enabling review of a digital multimedia presentation and redirection therefrom. Certain details and features have been left out of flowchart 300 that are apparent to a person of ordinary skill in the art. Thus, a step may comprise one or more substeps or may involve specialized equipment or materials, for example, as known in the art. While steps 310 through 350 indicated in flowchart 300 are sufficient to describe one embodiment of the present method, other embodiments may utilize steps different from those shown in flowchart 300, or may include more, or fewer steps.

Referring to step 310 of flowchart 300 and FIG. 2, step 310 comprises launching review and redirection application 240a or 240b. As previously discussed, in some embodiments, review and redirection application 240a or 240b may be a stand alone application, in which circumstance step 310 may correspond to auto-launch of the respective review and redirection application through a self execution process. In those embodiments, launch of review and redirection application 240a or 240b may occur in response to a command received from the computing environment in which the review and redirection application resides, such as respective multimedia presentation server 210 or client computer 250, for example.

Launching the review and redirection application in step 310 allows review and redirection application 240a or 240b to interact with respective media player 220a or 220b, and/or access digital multimedia presentation content stored on presentation content database 212. In one embodiment for example, launch of the review and redirection application may occur independently of presentation of a particular digital multimedia content item by media player 220a or 220b. In other embodiments, however, launch of the review and redirection application may be coordinated with play of a digital multimedia presentation by media player 220a or 220b. For instance, in one embodiment, launching the review and redirection application may occur prior to completion of play of the digital multimedia presentation session, perhaps during the presentation of credits near the end of the presentation session.

The method of flowchart 300 continues with step 320, which comprises identifying the digital multimedia presentation. Step 320 may be performed by review and redirection application 240a or 240b through communication with respective media player 220a or 220b, during presentation of a digital multimedia content item by media player 220a or 220b, for example. In an embodiment in which review and redirection application 240a or 240b functions independently of media player 220a or 220b, identifying the digital multimedia presentation serving as the subject of review and redirection may occur in response to inputs received from the consumer via client computer 250.

Continuing with step 330 of flowchart 300, step 330 comprises determining one or more recommended alternative items of digital multimedia content. Referring to FIG. 1, step 330 encourages consumer 158 to enjoy related content and provides guidance in identifying and redirecting to that content. In one embodiment, determining the recommended alternative items of digital multimedia content may reduce to identifying predetermined alternative content on the basis of the digital multimedia presentation identified in step 320. In other embodiments, such as in the embodiment of FIG. 2, determination of alternative content may be a dynamic operation performed by recommendation engine 242a or 242b, on the basis of, for example, consumption history of the consumer, consumer provided inputs, or other discrimination criteria.

Step 340 of flowchart 300 comprises integrating a review and redirection pane with a contextual background corresponding to the digital multimedia presentation. Integration of a review and redirection pane produced by review and redirection application 240a or 240b with an appropriate contextual background 214 drawn from presentation content database 212, can be performed by the review and redirection application. In embodiments in which review and redirection is coordinated with a presentation session of digital multimedia content, integration may be performed interactively by review and redirection application 240a or 240b, in cooperation with respective media player 220a or 220b.

Contextual backgrounds 214 may be presented to provide visual cues reinforcing a theme or motif of the digital multimedia presentation identified in step 320. For example, a contextual background for the ABC TV program Lost, set on a periodically deserted island, may show an uninhabited tropical beachscape, corresponding to the geographical theme of the program, while the contextual background for the ABC TV program Grey's Anatomy may show a cityscape of Seattle, Wash., in which most of the events of the drama take place. In one embodiment, contextual backgrounds 214 may be dynamic, perhaps including one or more dynamic graphical asset such as a search plane for the program Lost, or a Life Flight helicopter for Grey's Anatomy, that might circle continuously in the background sky for example. Alternatively, contextual backgrounds 214 might be made dynamic by virtue of simulating the daily solar cycle, by displaying a daylight background sky during some portions of the day, and a dawn, sunset, or nightfall background at other appropriate times. In addition, in some embodiments, contextual backgrounds 214 may include interactive graphical assets such as consumer polls, games, puzzles, questions, or interactive advertising graphics, for example.

Referring now to step 350 of flowchart 300, step 350 comprises providing the review and redirection pane to enable the consumer to play the digital multimedia presentation, redirect to the one or more recommended alternative items of digital multimedia content, or interact with one or more items of advertising content associated with the digital multimedia presentation. A specific example of such a display is provided by FIG. 4, which shows a visual frame that includes an exemplary review and redirection pane supporting review and redirection relating to a particular episode of the ABC TV program Grey's Anatomy.

Turning to FIG. 4, FIG. 4 shows visual frame 400, which comprises review and redirection pane 432 supporting episode 434 of Grey's Anatomy, integrated with contextual background 424, according to one embodiment of the present invention. As shown in FIG. 4, review and redirection pane 432 includes replay control 436, recommended alternative items of digital multimedia content 438a, 438b, and 438c, and advertising content 440 associated with episode 434. For example, as shown in FIG. 4, recommended alternative item 438a is "watch the next episode" of an episode of a TV series just played, recommended alternative item 438b is "watch this deleted scene" of an episode of a TV series, recommended alternative item 438c is "watch this week's episode" of another TV series.

As may be seen from FIG. 4, in the present embodiment, review and redirection pane 432 is configured to enable the consumer to play the digital multimedia presentation, i.e., episode 434, by using replay control 436. In addition, review and redirection pane 432 is configured to enable the consumer to redirect to recommended alternative items of digital multimedia content 438a, 438b, and 438c, by selecting their representative visual images, for example. Review and redirection pane 432 is further configured to enable the consumer to interact with one or more of advertising content 440 associated with the digital multimedia presentation. It is noted that the consumer may utilize review and redirection pane 432 to interact directly with advertising content 440, without playing or replaying episode 434.

As previously described in conjunction with FIG. 1, in embodiments like that shown in FIG. 4, in which a consumer may selectively return to advertising content associated with a digital multimedia presentation, significant benefits may accrue to consumers and advertisers alike. Consumers are advantageously empowered with a degree of selective control over the advertising content to which are exposed, while advertisers are provided with the opportunity to attract consumers into a voluntary interaction with their advertising materials. Consequently, consumers may be more receptive to the advertising content to which they are exposed.

The embodiment shown by FIG. 4 is merely exemplary, however, and in other embodiments review and redirection pane 432 may enable the consumer to provide feedback regarding episode 434, such as rating the desirability of the episode, or providing commentary on the episode. In one embodiment, review and redirection pane 432 enables the consumer to embed all or part of episode 434 on a web page selected by the consumer, perhaps by providing a field for entry of a destination Uniform Resource Identifier (URI), such as a Uniform Resource Locator (URL) associated with the selected web page. In yet another embodiment, review and redirection pane 432 is configured to enable the consumer to interact with commentary about episode 434 provided by a community of consumers, by linking to and participating in a group chat, or viewing party, for example.

Thus, the system and method enabling review of a digital multimedia presentation and redirection therefrom disclosed in the present application enhance and render the consumer experience of identifying and accessing desirable digital multimedia content both more enjoyable and more intuitive. Moreover, the disclosed system and method provide a means for advertisers to advantageously deliver marketing content to consumers in a manner that engages the consumer as a participant in an interactive process.

From the above description of the invention it is manifest that various techniques can be used for implementing the concepts of the present invention without departing is from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system comprising:
   a processor;
   a memory; and
   a presentation content database stored in the memory, the presentation content database configured to store a plurality of digital multimedia presentations each including an episode and a credit portion near an end of the episode;
   a media player for execution by the processor and configured to play a selected digital multimedia presentation of the plurality of digital multimedia presentations;
   a review and redirection application for execution by the processor and configured to determine at least one of the plurality of digital multimedia presentations as an alternative to the selected digital multimedia presentation;
   wherein the processor is configured to launch the review and redirection pane during the credit portion near the end of the episode to present a consumer with the alternative to the selected digital multimedia presentation, and wherein the review and redirection pane is further configured to enable the consumer of the selected digital multimedia presentation to rate the selected digital multimedia presentation and/or comment on the selected digital multimedia presentation;
   wherein the review and redirection pane comprises one or more integrated dynamic contextual backgrounds.

2. The system of claim 1, wherein the review and redirection pane is further configured to enable the consumer of the selected digital multimedia presentation to interact with commentary about the selected digital multimedia presentation provided by a community of consumers of the selected digital multimedia presentation.

3. The system of claim 1, wherein the system is a server, and wherein the media player and the review and redirection application are executed by the processor of the server, and the media player plays the selected digital multimedia presentation for a computer of the consumer over a packet network.

4. The system of claim 1, wherein the selected digital multimedia presentation is a TV episode of a series, and the alternative to the selected digital multimedia presentation is a next TV episode of the series.

5. The system of claim 1, the alternative to the selected digital multimedia presentation is a deleted scene from the selected digital multimedia presentation.

6. A method for use by a system including a processor and a memory having a presentation content database stored therein, the presentation content database including a plurality of digital multimedia presentations each including an episode and a credit portion near an end of the episode, the method comprising:
   launching, using the processor, a media player to play a selected digital multimedia presentation of the plurality of digital multimedia presentations;
   playing, using the processor, the selected digital multimedia presentation;
   launching, using the processor, in response to the playing the credit portion near the end of the episode of the selected digital multimedia presentation, a review and redirection application to present a consumer with an alternative to the selected digital multimedia presentation;
   determining, using the review and redirection application executed by the processor, at least one of the plurality of digital multimedia presentations as the alternative to the selected digital multimedia presentation; and
   enabling, using the review and redirection application executed by the processor, the consumer of the selected digital multimedia presentation to rate the selected digital multimedia presentation and/or comment on the selected digital multimedia presentation;
   wherein the review and redirection pane comprises one or more integrated dynamic contextual backgrounds.

7. The method of claim 6 further comprising:
   enabling, using the review and redirection application executed by the processor, the consumer of the selected digital multimedia presentation to interact with commentary about the selected digital multimedia presentation provided by a community of consumers of the selected digital multimedia presentation.

8. The method of claim 6, wherein the system is a server, and wherein the media player and the review and redirection application are executed by the processor of the server, and the media player plays the selected digital multimedia presentation for a computer of the consumer over a packet network.

9. The method of claim 6, wherein the selected digital multimedia presentation is a TV episode of a series, and the alternative to the selected digital multimedia presentation is a next TV episode of the series.

10. The method of claim 6, the alternative to the selected digital multimedia presentation is a deleted scene from the selected digital multimedia presentation.

\* \* \* \* \*